United States Patent Office 3,260,419
Patented July 12, 1966

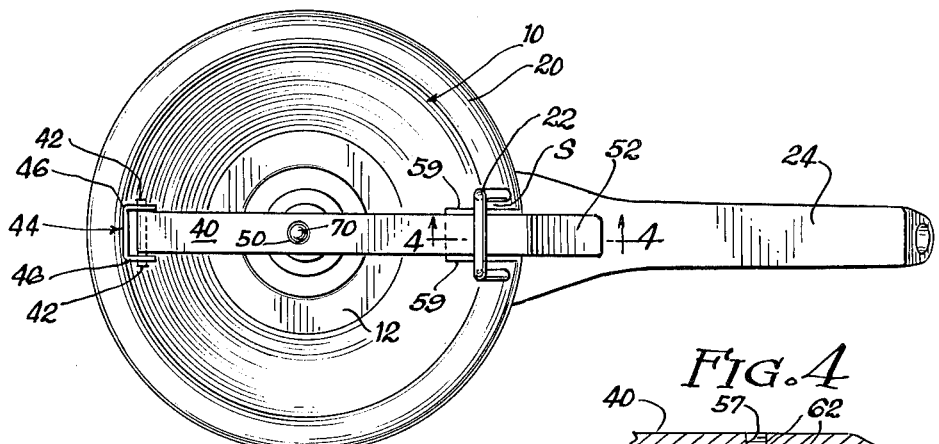
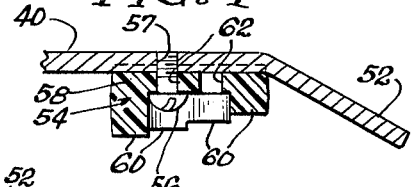
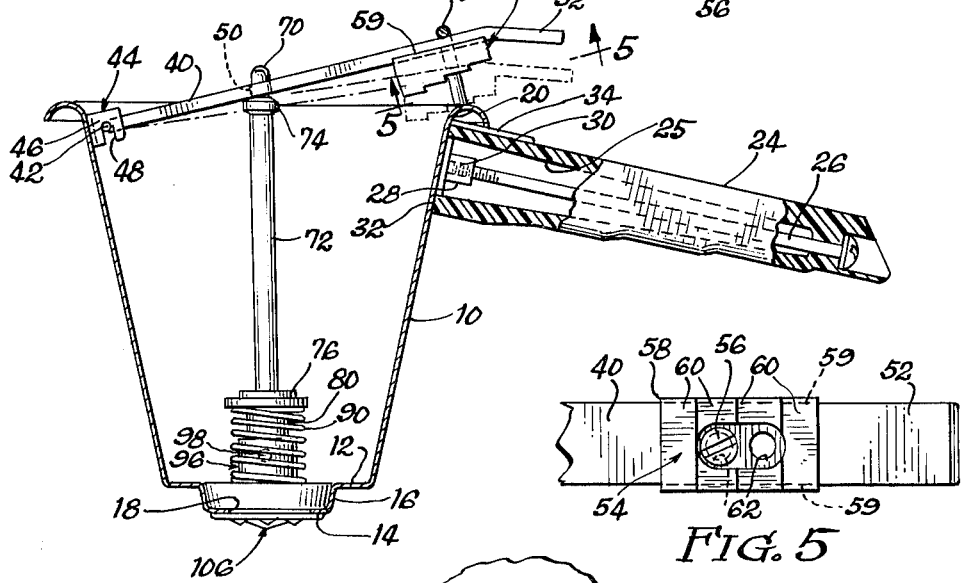
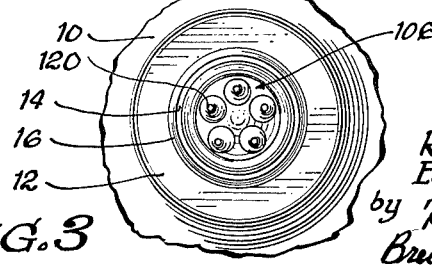

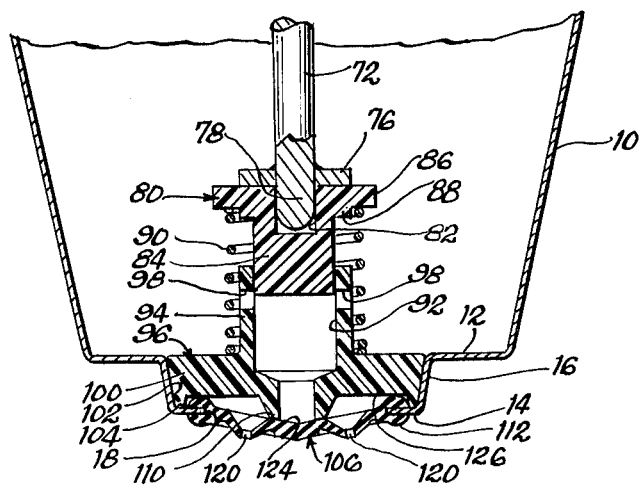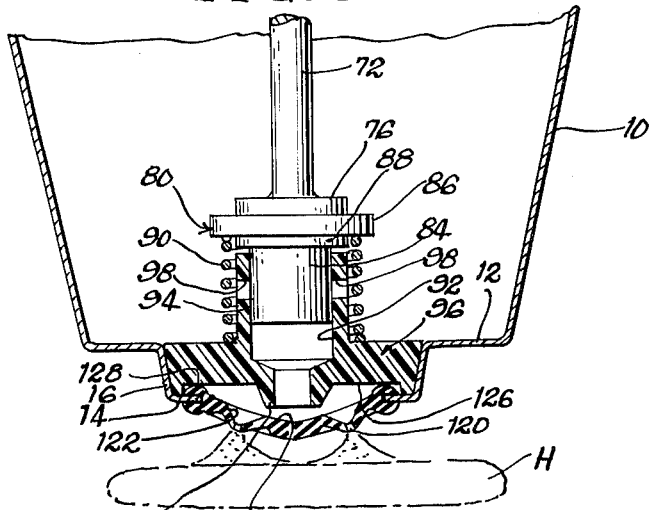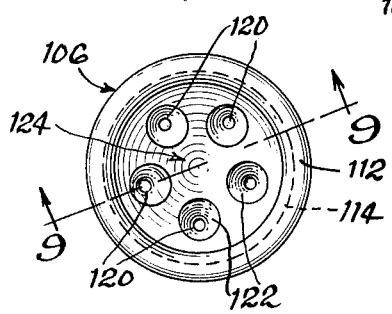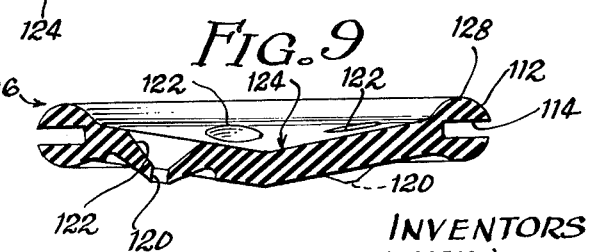

3,260,419
DISPENSER WITH PLUNGER AND
DIFFUSOR OUTLET
Ralph E. Weimer, Lombard, and Edward G. Stalder, Wood Dale, Ill., assignors to McDonald's System, Inc., Chicago, Ill., a corporation of Illinois
Filed Jan. 8, 1965, Ser. No. 424,310
5 Claims. (Cl. 222—309)

This invention relates to a dispenser for fluid and semi-fluid materials.

This invention is particularly concerned with a dispenser adapted to dispense fluid and semi-fluid materials such as condiments and the like in predeterminable patterns over objects such as hamburgers. This invention is also directed to an easily operated and hand manipulatable dispenser which is adapted repeatedly to dispense predeterminable quantities of fluid and semi-fluid materials, such as condiments and the like over objects such as hamburgers.

In food handling operations such as restaurants it is desirable to provide simple implements for use in carrying out the processing of food. One step in the handling and sale of food products such as hamburgers is that of seasoning after cooking. With hamburgers, and particularly in large volume food handling operations such as drive-in restaurants, condiments such as catsup or mustard are often applied prior to the sale of hamburgers to the customers. In such situations it is important and desirable that condiments to be provided on the food product are applied in uniform quantities, and preferably in predeterminable patterns which best distribute the condiment over the food product. That is important both in terms of uniformity of taste of the food product as well as in terms of cost, both labor cost and condiment cost. It is also desirable that dispensers used in food handling operations be sanitary and of simple construction so that they may be easily assembled and disassembled for thorough cleaning. While condiment dispensers per se are known, the dispenser of this invention provides novel features and unique advantages unattainable with prior art dispensers.

The novel dispenser of this invention provides a shell for containing a substantial quantity of dispensable fluid or semi-fluid material and provides novel means cooperable with a discharge opening in the shell for dispensing predeterminable quantities of dispensable fluid in predeterminable patterns upon an object such as a hamburger. The novel dispensing means comprises a diffusor valve having a dispensing segment cooperable with a movable piston and cylinder means for providing fluid communication between the cylinder and diffusor valve dispensing segment in one portion of the cycle of movement of said movable piston and for preventing fluid communication therebetween in another portion of the cycle of movement of said movable piston for repeatedly dispensing predeterminable quantities of dispensable fluid during said one portion of the cycle of movement of the movable piston. This invention also contemplates novel means for positively adjusting the limits of movement of the movable piston for varying the quantity of fluid to be dispensed during a cycle of movement of the movable piston.

It is therefore an object of this invention to provide a novel and improved dispenser for fluid and semi-fluid material for dispensing repeatedly predeterminable quantities of said material in predeterminable patterns.

Yet another object of this invention is the provision of a novel hand-manipulatable and hand-operable dispenser for fluid and semi-fluid material such as a condiment and for repeatedly dispensing such material in a predeterminable quantity and pattern.

Another object contemplated by this invention is the provision of an improved dispenser comprising a dispenser shell for containing dispensable material and having a discharge opening at which dispensing means are provided, in which said dispensing means includes a diffusor valve defining at least one dispensing aperture in communication with said discharge opening, a cylinder, a piston, means for moving said piston within said cylinder between a first and a second position and for returning said piston to said first position to complete a cycle of said dispensing means, means for providing fluid communication between said cylinder and the interior of said shell in one portion of each cycle and means for preventing and for providing fluid communication between said cylinder and said dispensing aperture during other portions of each cycle thereby to dispense through said discharge opening during a said cycle a predetermined quantity of material to be applied to an object in a predetermined pattern.

Still another object of this invention is the provision of novel means for predetermining the quantity of material to be dispensed during a dispensing cycle of a dispenser of the shell type in which said means comprises a movable actuating lever articulatably secured to a dispenser shell and operatively engaging dispensing means, means integral with said shell remote from the point of articulation of said lever for limiting the range of movement of said actuating lever, and adjustable means disposed between said actuating lever and said limiting means for varying the range of movement of said actuating lever.

These and further objects and advantages of this invention will become apparent from the following description and drawings of which:

FIGURE 1 is a plan view of a dispenser of this invention;

FIG. 2 is a side view, partially in section, of the dispenser of FIG. 1, showing in phantom a second position of the actuating lever of the dispenser;

FIG. 3 is a partial bottom view of the dispenser of FIG. 1;

FIG. 4 is a partial sectional view taken substantially along line 4—4 of FIG. 1;

FIG. 5 is a partial bottom view taken substantially along line 5—5 of FIG. 2;

FIG. 6 is an enlarged partial sectional view similar to FIG. 2;

FIG. 7 is a view similar to FIG. 6 showing the dispensing means in a dispensing position;

FIG. 8 is a plan view of the diffusor valve of FIG. 3; and

FIG. 9 is a side sectional view taken substantially along line 9—9 of FIG. 8.

Now referring to the drawings, and particularly to FIGURES 1 and 2, a presently preferred embodiment of this invention is shown to include a generally vertical frusto-conical container or shell 10. Adjacent its base, shell 10 provides an annular ledge 12, an annular floor 14 and a frusto-conical connecting web 16. Annular floor 14 defines a circular discharge opening 18 at the base of shell 10.

At its top, shell 10 is provided with an outwardly curved lip 20. An upwardly extending U-shaped hook 22 is secured, as by welding, to lip 20. Lip 20 and U-shaped hook 22 cooperate to define a vertical slot S which serves as a limiting means for an actuating lever to be described.

Beneath the portion of the lip underlying U-shaped hook 22 a handle 24 is provided. Handle 24 defines a longitudinal channel 25 therethrough for receiving and accommodating a connecting bolt 26. The end of the shank of connecting bolt 26 is threaded to be threadedly received within the threaded bore 30 of mounting stud 28. Mounting stud 28 is secured as by welding to the exterior of shell 10 beneath lip 20. The shell contacting forward face 32 of handle 24 is complementary to the exterior surface of shell 10 which it contacts. Mounting stud 28 and handle 24 are positioned so that an upper bead 34 on handle 24 will firmly contact the outer terminal edge of lip 20 when bolt 26 is threaded tightly into bore 30 of mounting stud 28. In that manner handle 24 and shell 10 are securely and immovably interconnected to each other. Handle 24 may be readily removed for cleaning simply by withdrawing connecting bolt 26.

An actuating lever 40 is provided adjacent the top of shell 10. Laterally extending stub axles 42 are secured to one end of lever 40. Diametrically opposite U-shaped hook 22 and adjacent the top of shell 10, a U-shaped bracket 44 secured as by welding to the interior of shell 10 is provided. Bracket 44 includes inwardly extending arms 46 which define generally vertically extending open-bottomed slots 48 for receiving stub axles 42 therein. Arms 46 are spaced apart a distance slightly greater than the transverse dimension of actuating lever 40 to permit free relative movement of lever 40 therebetween. In its central portion, actuating lever 40 defines a lever aperture 50 for a purpose to be described. At the end of actuating lever 40 remote from bracket 44, an angled trigger 52 is provided.

Adjacent trigger 52 means are provided for adjusting the stroke of the actuating lever within slot S for varying the quantity of material to be dispensed through discharge opening 18. In this embodiment the adjusting means comprises a stop 54 secured to actuating lever 40 by a threaded bolt 56 received in a threaded bore 57 in lever 40. Stop 54 comprises a main body section 58 and upwardly extending arms 59 spaced apart a distance substantially equal to the transverse dimension of actuating lever 40. Main body section 58 of stop 54 defines a plurality of steps 60. As seen in FIGS. 4 and 5 stop 54 defines two bolt receiving apertures 62. By moving bolt 56 from one aperture to the other aperture, and by threading bolt 56 into threaded bore 57 of actuating lever 40, stop 54 may be effectively moved longitudinally of actuating lever 40. Additionally stop 54 may be rotated 180° with respect to a major plane of actuating lever 40. Bore 57 is located to position the horizontal portion of a step 60 in contact with lip 20 when the actuating lever is moved within the vertical limits of slot S. The two apertures 62 and the permissive rotation of stop 54 make possible the positioning selectively of the four different steps 60 to contact lip 20 thereby to adjust the range of movement of actuating lever 40 within slot S.

Lever aperture 50 is proportioned to receive a head 70 of an operating rod 72. A collar 74 immovably secured to operating rod 72 lies beneath aperture 50 to position operating rod 72 with respect to actuating lever 40. The lower end of operating rod 72 includes an enlarged cylindrical shoulder 76 and a depending connecting segment 78. A piston 80 defines a central bore 82 proportioned to receive connecting segment 78 in a press fit thereby to secure operating rod 72 to piston 80. Piston 80 also includes a cylindrical elongated piston rod 84, an upper cylindrical flange 86 upon which cylindrical shoulder 76 is seated and an intermediate cylindrical collar 88. Upper flange 86 and collar 88 are proportioned to seat and restrict lateral movement of the upper end of a compression spring 90. As such, the inside diameter of spring 90 is substantially the same as the outside diameter of shoulder 88. The outside diameter of flange 86 is somewhat greater than the outside diameter of spring 90.

Piston rod 84 of piston 80 is received by a cylinder means 96. Cylinder means 96 provides a cylinder 94 defining a cylinder bore 92. In use piston rod 84 remains within cylinder bore 92. Bore 92 includes an upper piston rod receiving portion as well as lower portions of reduced diameter. Cylinder 94 defines a pair of ports 98 to provide communication between bore 92 and the interior of shell 10. Cylinder means 96 also includes a horizontal flange 100, the outer peripheral edge 102 of which is of substantially the same dimension as web 16 of shell 10. Adjacent its base, horizontal flange 100 defines a continuous annular foot 104 proportioned to be seated on annular floor 14 and to circumscribe a diffusor valve 106. Circumscribing its axial center, cylinder means 96 defines a continuous annular rim 110 which extends beneath the horizontal plane of the lower edge of annular foot 104 to be sealingly seatable upon a central segment of diffusor valve 106.

Diffusor valve 106 comprises a bead 112 and defines a generally horizontal cylindrical slot 114. Slot 114 is proportioned to sealingly receive the innermost edge of annular floor 14 to secure diffusor valve 106 to shell 10 within discharge opening 18 thereof. The portion of diffusor valve 106 which lies inwardly of bead 112 is of a very shallow conical configuration. The inwardly extending portion defines a plurality of dispensing apertures 120 which, in the embodiment shown, are circular in plan view. Each dispensing aperture 120 terminates inwardly in a generally conical cavity 122.

As seen in FIG. 6 annular rim 110 of cylinder means 96 is sealingly seated upon a central segment 124 of diffusor valve 106. In certain portions of an operating cycle to be described of the dispenser the seating engagement between rim 110 and central segment 124 seals cavities 122 and apertures 120 from bore 92 of cylinder means 96. As seen in FIG. 7 during other portions of an operating cycle, diffusor valve central segment 124 is movable from its sealing engagement with annular rim 110 to provide communication between dispensing apertures 120 and bore 92 thereby to permit the dispensing of material in bore 92 through dispensing apertures 120 in a predetermined pattern onto an object such as hamburger H.

To restrict communication between dispensing apertures 120 and the interior of shell 10 peripheral edge 102 of flange 100 sealingly contacts web 16. Additionally the lower surface 126 of flange 100 is urged into sealing engagement with the upper edge 128 of bead 112 by spring 90. Bead 112 and cylinder means 96 are proportioned so that the compressive forces of spring 90 are required to fully seat annular foot 104 upon annular floor 14 requiring therefore some deformation of bead 112 to seat annular foot 104 on annular floor 14. As a result lower surface 126 sealingly engages bead 112.

While it will be appreciated that other materials may be substituted therefor, piston 80 and cylinder means 96 in this embodiment are fabricated of a rigid nylon. Diffusor valve 106 is fabricated of a yieldable sanitary rubber material such as gum rubber. The remaining parts which have been described above are fabricated of stainless steel. Those materials are all suitable for use in handling food products and for use in a sanitary dispenser of the type described herein. Other materials may be substituted therefor for use in sanitary environments as well as in environments where sanitation is not a prime consideration.

To assist in a full appreciation and understanding of the illustrative dispenser of this invention a cycle of operation will now be described.

After the dispenser has been assembled in the manner illustrated and shell 10 has been filled with dispensable material and after the appropriate step 60 has been positioned in the manner described to predetermine the quantity of material to be dispensed, an operator grips handle 24 and places his thumb on trigger 52. The trigger is actuated by exerting downward pressure thereon against the force of spring 90 for several cycles until bore 92 is filled with dispensable material. An illustrative dispensable material is semi-fluid mustard.

Compression spring 90 is sized to urge actuating lever 40 upwardly into engagement with the horizontal portion of U-shaped hook 22 and stub axles 42 into engagement with the upper closed ends of slots 48. It also forces cylinder means 96 downwardly so that the annular rim 110 is sealingly seated upon central segment 124 of diffusor valve 106. Additionally spring 90 urges annular foot 104 into seating engagement with annular floor 14 to effect sealing engagement between lower surface 126 and bead 112 and to urge flange edge 102 into engagement with web 16.

As trigger 52 is depressed, piston rod 84 is moved downwardly against the force of spring 90 past ports 98. Once past ports 98 piston rod 84 prevents communication between bore 92 and the interior of shell 10 through ports 98 and exerts pressure against the mustard in bore 92. As piston rod moves downwardly the force exerted against the mustard forces the central segment 124 of diffusor valve 106 downwardly unseating annular rim 110 thereby providing fluid communciation between bore 92, cavities 122 and dispensing apertures 120. The mustard is then forced through apertures 120 to be deposited on a hamburger. In the illustrative embodiment five apertures 120 are provided. They are spaced equally from the adjacent apertures and are located along a circle the center of which lies on the axis of circular diffusor valve 106. Since they are spaced in that fashion the mustard is deposited in a star-shaped pattern on the underlying hamburger H. It will be noted that the mustard diffuses or spreads after it leaves apertures 120 so that the mustard when it is deposited on the hamburger is somewhat spread out.

The piston rod 84 continues its movement downward until the selected step 60 of stop 54 contacts the portion of lip 20 which forms part of the slot S in which actuating lever 40 moves (see FIG. 2). Once the lip 20 is contacted, the predetermined quantity of mustard has been dispensed in the predetermined pattern and the downward or discharging portion of the cycle of operation is completed.

At that point downward force on the trigger is relieved and actuating lever 40 oscillates in a counterclockwise direction (as seen in FIG. 2) about bracket 44 and trigger 52 moves upwardly allowing operating rod 72 and the associated piston rod 84 to move upwardly. As piston rod 84 moves upwardly annular rim 110 and central segment 124 of diffusor valve 106 become sealingly reseated and a vacuum is created in bore 92. When piston rod 84 moves upwardly past ports 98, fluid communication between the interior of shell 10 and bore 92 is re-established and the reduced pressure in bore 92 draws mustard from the shell interior, through ports 98 into bore 92 replenishing the mustard supply in bore 92. Actuating lever 40 then moves completely upwardly in slot S until it is resiliently urged against the horizontal arm of U-shaped hook 22 by compression spring 90 to complete a dispensing cycle. When it reaches that position, the trigger may be moved downwardly to begin another dispensing cycle to dispense the same quantity of fluid in the same pattern as in the preceding dispensing cycle.

While a specific embodiment of this invention has been described it is apparent that many modifications and changes in specific details may be made without departing from the spirit and scope contemplated herein.

We claim:

1. In a manual fluid dispenser having a vertical shell, an outwardly extending handle connected to said shell, dispensing means in said shell and an elongated operating lever for operating said dispensing means; confining means defined by said shell, said operating lever being articulatably mounted at one end upon said shell opposite said confining means, the other end portion of said operating lever being received within said confining means and positioned adjacent said handle, and means movable into a plurality of predeterminable positions intermediate said operating lever and said confining means for varying the range of movement of said operating lever within said confining means.

2. The fluid dispenser of claim 1 in which said confining means comprises a lip at the upper edge of said vertical shell and an upwardly extending vertical slot defining member secured to said vertical shell, said confining means thereby defining a vertical slot in which said operating lever is movable, and in which said means movable into a plurality of predeterminable positions is a stepped stop releasably secured to said operating lever and positioned thereon to engage a horizontal portion of said vertical slot thereby to vary the range of vertical movement of said operating lever within said slot when said operating lever is articulated about said one end.

3. A sanitary condiment dispenser comprising in combination a vertical shell defining an opening adjacent its bottom, a diffusor valve secured to said dispenser adjacent said opening and defining a plurality of dispensing apertures, a cylinder means defining a cylinder bore and discharge port means overlying said diffusor valve, said cylinder bore and said discharge port means being in open communication with each other, a piston means disposed within said cylinder bore, a charging port defined by said cylinder means and in open communication with said shell interior and said cylinder bore when said piston means is in an upper idle position, said charging port being disposed intermediate said discharge port means and the upper end of said cylinder bore, means connected to said piston means for moving said piston means from said upper idle position to lower dispensing positions in which said piston means closes said charging port to prevent communication between said charging port and said cylinder bore, sealing means provided by said cylinder means and said diffusor valve for sealing said dispensing apertures from communication with said cylinder bore when said piston means is in said upper idle position and when said piston means is returning from said dispensing positions to said upper idle position, said piston means, said diffusor valve and said cylinder means being proportioned to prevent direct communication between said shell interior and said dispensing apertures in all positions of said piston means.

4. The sanitary condiment dispenser of claim 3 in which said diffusor valve is a resilient rubber valve secured to said shell adjacent its periphery and in which said cylinder means includes annular rim means in sealing engagement with said diffusor valve, said annular rim means sealingly surrounding a portion of said diffusor valve remote from said dispensing apertures in said upper idle position and when said piston means is returning from said dispensing positions to said upper idle position.

5. The sanitary condiment dispenser of claim 3 in which said sealing means defined by said cylinder means and said diffusor valve is substantially airtight whereby as said piston means is returning from said dispensing positions to said upper idle position a vacuum is drawn thereby to draw condiment from said shell interior through said charging port and into said cylinder bore when said piston means opens said charging port.

References Cited by the Examiner

UNITED STATES PATENTS 2,805,891    9/1957    Sanborn            239—535
3,150,802    9/1964    Pribyl             222—385 X ROBERT B. REEVES, *Primary Examiner.*

HADD S. LANE, *Examiner.*